United States Patent [19]
Peshina et al.

[11] 3,747,307
[45] July 24, 1973

[54] TELESCOPIC SUPPORT FOR BAG FILTERS

[75] Inventors: William J. Peshina; William F. Peshina, both of North Royalton; Roger F. Stevers, Cleveland, all of Ohio

[73] Assignee: Royal Wire Products, Inc., North Royalton, Ohio

[22] Filed: Dec. 27, 1971

[21] Appl. No.: 212,333

[52] U.S. Cl. .................................. 55/379, 55/341
[51] Int. Cl. .......................................... B01d 46/02
[58] Field of Search ................... 55/341, 378, 379, 55/498; 210/333

[56] References Cited
UNITED STATES PATENTS

| | | | |
|---|---|---|---|
| 3,349,919 | 10/1967 | Royer et al. | 210/315 |
| 3,550,359 | 12/1970 | Fisher et al. | 55/379 |
| 3,594,992 | 7/1971 | Carr et al. | 55/341 |

FOREIGN PATENTS OR APPLICATIONS

| | | | |
|---|---|---|---|
| 55,617 | 1/1946 | France | 55/379 |
| 887,772 | 1/1962 | Great Britain | 55/379 |

*Primary Examiner*—Bernard Nozick
*Attorney*—Walter Maky et al.

[57] ABSTRACT

A telescopic support for bag filters or the like including an outer cage assembly having a top thimble and an inner cage assembly selectively telescoped within the outer assembly, the top of the bag filter being clamped to the thimble with the remainder of the bag being suspended therebelow about the support. Each cage assembly is substantially cylindrical and includes a plurality of interconnected vertical and horizontal wires. The wires of the two cages are cooperatively configured to permit relative axial sliding of the assemblies for expansion and contraction of the support without relative rotation of such assemblies. The support may be expanded to a maximum longitudinal extent coincident with the length of the bag filter, and the two cage assemblies are interlocked at maximum expansion by cooperative interengagement of wires on such assemblies.

11 Claims, 9 Drawing Figures

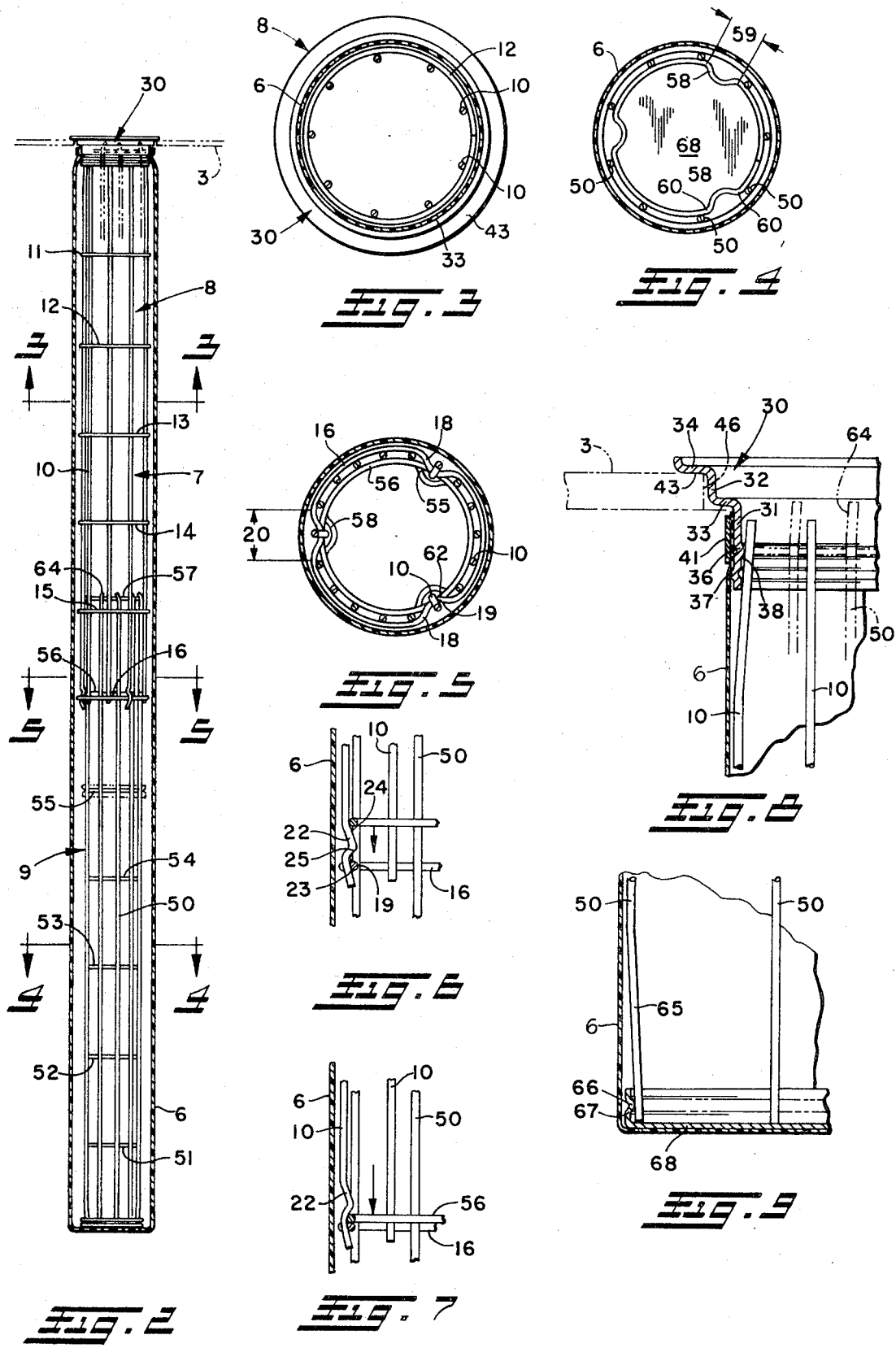

TELESCOPIC SUPPORT FOR BAG FILTERS

The present invention relates as indicated to a bag filter support and more particularly to a support that may be expanded and rigidly locked after the support and attached filter have been inserted through a tube sheet.

The bag filters with which the present supports are used vary from three to nine feet in length depending upon the particular filtering application or model. The filters are normally shipped on the supports to the field installation site. Thus, particularly with the longer filters, it is advantageous to provide a collapsible support to maximize shipping loads and to facilitate field installation.

Accordingly, it is the principal object of the present invention to provide a support which telescopically collapses for shipping and installation but which may readily be expanded to full filter length after insertion through the tube sheet.

It is another important object of the present invention to provide a bag filter support that has two cage assemblies adapted for relative axial sliding to expand and collapse the support without relative rotation between such assemblies. One of the assemblies telescopes within the other assembly and the wires of the two cages are cooperatively formed and interfitted to permit axial movement while precluding relative rotational movement.

It is still another important object of the present invention to provide a support having telescoping cage assemblies that have a press fit interlock rigidly to maintain the support at the preselected point of maximum expansion.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 2 is an elevation partially in section of the bag support of the present invention in extended and locked position, with the phantom lines indicating the collapsed or telescoped position of the support;

FIG. 3 is a horizontal section taken substantially along line 3—3 of FIG. 1 showing the outer cage assembly;

FIG. 4 is a horizontal section taken substantially along line 4—4 of FIG. 1 showing the inner cage assembly;

FIG. 5 is a horizontal section taken substantially along line 5—5 of FIG. 1 showing the nesting of the two cage assemblies at the intermediate portion of the extended support;

FIG. 6 is a fragmentary and enlarged vertical section showing the two cage assemblies during axial expansion but before the inner assembly is interlocked with the outer assembly;

FIG. 7 is an enlarged and fragmentary vertical section similar to FIG. 6 showing the interlocked position of the inner and outer cage assemblies;

FIG. 8 is a fragmentary and enlarged vertical section showing the upper portion of the outer cage assembly and the top support thimble welded thereto; and FIG. 9 is a fragmentary and enlarged vertical section showing the bottom portion of the inner cage assembly and the base welded thereto.

Figure 1:
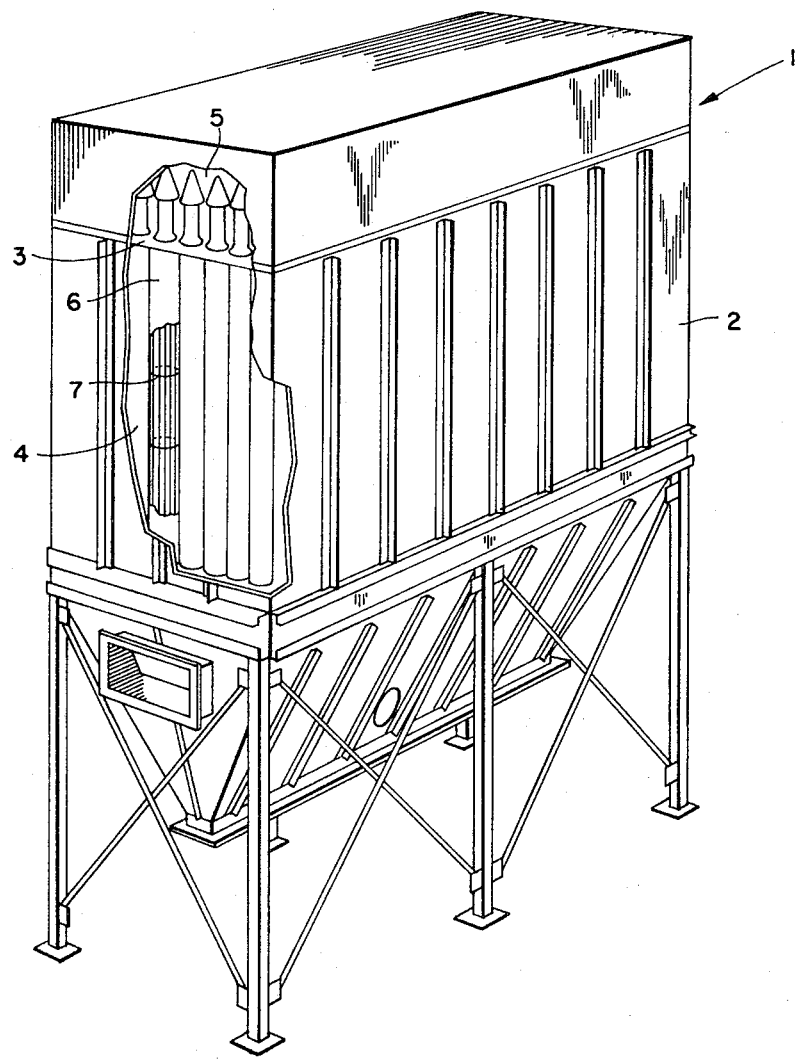
FIG. 1 is a partially broken away perspective showing the bag support of the present invention in the plenum chamber of a dust filter apparatus.

Referring now in more detail to the drawings and initially to FIG. 1 wherein like reference numerals indicate like parts, a dust filter indicated generally at 1 includes a housing 2 divided by tube sheet 3 into a lower plenum chamber 4 and an upper clean air exhaust chamber 5. A plurality of felted media filter bags 6 are suspended from tube sheet 3 into plenum chamber 4 by bag supports 7, such supports being operative to maintain the bag filters in the substantially cylindrical configuration shown. The air to be filtered is introduced into the heated plenum chamber and is drawn through filter bags 6, thereby to deposit dust and other foreign matter on or in such filters. The cleaned air then rises upwardly through apertures in tube sheet 3 into exhaust chamber 5. The filter bags 6 may periodically be cleaned by passing a shock wave or pulse downwardly through the bag, which wave rebounds and passes upwardly through the bag to provide a bi-directional cleaning action. The air filtration system just described, known as the "Pulseflow" system, was developed by Western Precipitation Group of Joy Manufacturing Co. and forms no part of the present invention except for bag supports 7 described in detail hereinbelow.

Referring now to FIG. 2, the telescopic bag support indicated generally at 7 includes an outer cage assembly 8 and an inner cage assembly 9. As shown in FIG. 1, inner cage assembly 9 is fully extended and interlocked by a press fit with outer cage assembly 8, although it will be appreciated that the inner cage assembly is adapted to telescope within assembly 8 to a nested position indicated by phantom lines, as will be described in more detail hereinafter.

Referring now to FIGS. 3, 5, 6 and 8, outer cage assembly 8 includes a plurality of substantially vertical wires 10 arranged in a cylindrical orientation. Wires 10 are equally peripherally spaced with nine of such wires being preferred and illustrated. A plurality of wires are drawn into circular configuration and butt welded to form hoops. Such hoops are spot welded to the outer diametrical surfaces of vertical wires 10 in a horizontal orientation with equal vertical spacing, as shown at 11–16, by an apparatus for making the bag support described in more detail in my co-pending application Ser. No. 266,978 filed June 28, 1972. The top five hoop wires 11–15 are identical with a circular configuration and have a diameter equal to or slightly greater than the outside diameter of vertical rods 10.

The bottom or end hoop wire 16 is formed with three inwardly turned loops 18 which are equally spaced about the periphery of hoop wire 16, as best shown in FIG. 5. Such spacing of the loops is selected in a manner to align three of the vertical wires 10 with the apices 19 of loops 18. The circumferential extent 20 of loops 18 approximately equals the circumferential spacing between adjacent vertical wires 10.

The bottom ends of wires 10 aligned with apices 19 have radially inwardly directed loops 22 above hoop wire 16, such wires being spot welded to the outside of apices 19, as shown at 23. Loops 22 form camming surfaces 24 and locking shoulders 25, such shoulders cooperating with hoop wire 16 to define a locking seat.

The upper ends of all vertical wires 10 are tapered slightly radially inwardly as illustrated at 27 in FIG. 8. Inward taper 27 enables the outside diameters of rods 10 to be spot welded to top support thimble 30, which has two major axial sections 31 and 32 and two radial sections 33 and 34. Axial section 31 is formed to include an annular inwardly turned bead 36 and an annular outwardly turned bead 37. Inwardly turned bead 36 provides an annular surface of limited width to which the inwardly tapered portions 27 of vertical wires 10 are spot welded, as shown at 38.

The external surface of axial portion 31 provides a shoulder to which the top of filter bag 6 may be secured by hose clamp 41 or the like. Outwardly turned bead 37 defines a stop to assist in maintaining clamp 41 in the seated position and further defines an outer circumferential dimension greater than the diameter of wires 10 and hoop wires 11-16. Such greater circumferential dimension permits filter bag 6, which is slightly greater in diameter than wires 11-16, normally to be free of contact with support 7.

Radial flange 34 of support 30 defines annular suspension shoulder 43. The outside diameter of axial portion 32 is dimensioned to have a diameter slightly less than the diameter of aperture 46 in tube sheet 3. Thus upon insertion of the support through aperture 46, annular suspension shoulder 43 rests upon the top surface of tube sheet 3 thereby to suspend the support in its FIG. 1 and FIG. 2 position.

Referring now to FIGS. 4-7 and 9, the inner cage assembly includes a plurality of vertical wires 50 which are disposed in a cylindrical orientation. Wires 50 are equally peripherally spaced at a diameter substantially equal to the diameter of coaxial wires 10 on the outer cage assembly.

Seven equally spaced, horizontally oriented hoop wires indicated at 51-57, are spot welded to the inner diametrical surfaces of vertical wires 50. The diameters of hoop wires 51-57 are thus less than the diameters of hoop wires 11-16 by an amount equal to twice the thickness of the vertical wires.

The bottom five hoop wires 51-55 are identically formed with three equally spaced inwardly turned loops 58, as best shown in FIG. 5. The striking radii of loops 58 are substantially equal to the striking radii of loops 18. The circumferential extent 59 of loops 58 is approximately equal to the distance between adjacent wires 50, with hoop wires 51-55 being positioned to locate vertical wires 50 adjacent the two base portions 60 of each loop 58, as shown in FIG. 4.

The top two hoop wires 56 and 57 of the inner cage assembly are completely circular in configuration as indicated at 62. Hoop wire 56 forms a part of the press fit interlock as will be described in more detail hereinbelow.

The upper terminal ends of vertical wires 50 are bent radially inwardly at 64 to avoid interference with the outer assembly during axial movement of the telescoping cage assemblies. The lower terminal ends of vertical wires 50 are slightly radially inwardly tapered as shown at 65 in FIG. 9. Such inward taper permits the vertical wires to be spot welded to an annular inwardly turned bead 66 on the axial flange 67 of base plate 68. Base plate 68 has a diameter slightly less than the diameter of bag 6 to provide the necessary clearance between the same for proper operation.

The inner cage assembly is concentrically received within the outer cage assembly in such a manner that the loops 18 and 58 are positioned in vertical alignment and the wires 10 and 50 are interdigitated or alternated, as shown in FIG. 5. This orientation permits the inner assembly axially to be slid for expansion of the bag support with loops 58 clearing loops 18 during such axial movement of the inner cage. The vertical alignment of loops 18 and 53 and the inward projection of loop 18 past wires 10 and 50 operate to preclude any relative rotation of the two cage assemblies.

The sliding axial extension of inner cage assembly 9 eventually draws hoop wire 56 into contact with camming surfaces 24 of the outer cage assembly 8. Sufficient force must be exerted axially upon inner cage assembly 9 to urge hoop wire 56 along camming surface 24, thereby slightly outwardly to spring loops 22 of vertical wires 10. Upon passing the apex of loop 22, circular hoop wire 56 will be captured or locked between shoulders 25 and the apices 19 of inwardly bent loops 18, as shown in FIG. 7. This press fit or interlock is operative to secure the support in the extended position illustrated in FIG. 2.

To collapse the telescopic support structure, a sufficient force in the opposite axial direction must be exerted on the inner assembly outwardly to spring loop 22 to allow hoop wire 56 to pass thereby. The fully retracted position of the inner cage is illustrated in FIGS. 2 and 8 by phantom lines. In such collapsed position, the outer diametrical surfaces of the top ends of wires 50 frictionally contact the inner diametrical surface of annular bead 36, thereby to provide additional resistance to inadvertent cage separation.

The positioning of support 7 and bag filter 6 into the operative FIG. 1 position is begun with the support in its collapsed or telescoped position. The length of the support in such collapsed position is slightly less than 5 feet which enables the support easily to be handled and maneuvered. Before insertion of the support, the top open end of bag filter 6 is drawn around annular flange 31 of support 30 and is secured thereto by hose clamp 41.

The collapsed support and attached bag is then lowered through aperture 46 in tube sheet 3 until annular support flange 43 engages and rests upon the top side of such tube sheet, thereby to suspend the entire assembly in the plenum chamber 4.

A long pole or the like (not shown) is then inserted downwardly into the collapsed support to engage the top surface of base plate 68. The pole may then be pushed further downwardly to effect axial separation of the telescoped inner cage from the outer cage until the two are interlocked by loop 22 and hoop wires 16 and 56. In the fully extended and locked position, the support assembly is slightly longer than eight feet and holds the bag filter in the substantially cylindrical position shown in FIG. 1 due to the contact of bottom plate 63 with the bottom of such filter. It will be appreciated that the supports are made in varying sizes to accommodate the different filter sizes, with the maximum length of each support coinciding with the length of the filter to be used therewith. The lateral clearance between the filter 6 and support 7 enables the filter to expand and contract in a radial direction for proper operation and cleaning.

The embodiments of the invention in which an exclusive property or privilege is claimed are defined as follows:

1. A support for bag filters and the like comprising an outer cage assembly having a support thimble at one end thereof, the open end of the bag filter being secured to such thimble, an inner cage assembly selectively telescoped within said outer cage assembly, means to permit relative axial movement between the two assemblies for expansion and contraction of the support while precluding relative rotation, and means to interlock the two assemblies at a preselected point of maximum expansion.

2. The support set forth in claim 1, wherein each assembly includes a plurality of vertical wires and a plurality of horizontal hoop wires connected thereto, the support thereby being generally cylindrical in configuration.

3. The support set forth in claim 2, wherein the means to interlock the two assemblies includes a press fit of an inner assembly hoop wire between at least one vertical wire and adjacent hoop wire on the outer assembly.

4. The support set forth in claim 3, wherein the vertical wire of the outer assembly is bent to form an inwardly projecting loop directly above the adjacent horizontal wire of the same assembly to form therewith a locking seat, the hoop wire of the inner assembly sequentially being drawn across said vertical wire loop during expansion of the support and then into the locking seat for interlocking the two assemblies at maximum expansion.

5. The support set forth in claim 2, wherein the hoop wires of the inner assembly are secured to the inside of the vertical wires and the hoop wires of the outer assembly are secured to the outside of the vertical wires, the vertical wires of the two assemblies being substantially equal in diameter and being circumferentially interdigitated.

6. The support set forth in claim 5, wherein the means to permit relative axial movement while precluding relative rotation comprises a plurality of axially aligned inwardly projecting loops on some of the hoop wires of the inner assembly and an inwardly projecting loop on the end hoop wire of the outer assembly, the outer loop projecting inwardly past the vertical wires and being axially aligned with and interfitted in the inner assembly loops, thereby to permit relative axial movement while precluding relative rotation.

7. The support set forth in claim 6, wherein the hoop wires of the inner assembly with loops are at the end of the support remote from the thimble and the remaining hoop wires of such inner assembly are circular in configuration.

8. The support set forth in claim 7, wherein the means to interlock includes at least one locking seat on the outer assembly adjacent the end thereof, one of the circular wires of the inner assembly being press fitted into said locking shoulder at maximum expansion of the support to interlock the two assemblies.

9. The support of claim 8 wherein the locking seat is formed by an inwardly directed loop on the vertical wire directly above the apex of the loop on the end hoop wire, the vertical wire being connected to the outside of such apex whereby the bottom of said vertical loop and the apex of said horizontal loop define the locking shoulder.

10. The support set forth in claim 2, wherein the bag filter is slightly larger in diameter than the vertical wires and is substantially equal in longitudinal extent to the length of the support at maximum expansion, the inner cage assembly having a bottom member confined to be slightly smaller in diameter than the bottom of the bag, whereby the bag filter is drawn into and generally maintained in cylindrical form by the support when the latter is at the position of maximum expansion.

11. The support set forth in claim 10, wherein the thimble has at least one axial surface and at least one radial surface, the bag filter being clamped to the axial surface and the support being suspended from a tube sheet by the radial surface.

* * * * *